(No Model.)

J. C. McAFEE.
NUT LOCK.

No. 297,824. Patented Apr. 29, 1884.

WITNESSES:
H. B. Brown
Edw. W. Byrn

INVENTOR:
J. C. McAfee
BY Munn & Co
ATTORNEYS.

UNITED STATES PATENT OFFICE.

JACOB C. McAFEE, OF DALLAS, WEST VIRGINIA.

NUT-LOCK.

SPECIFICATION forming part of Letters Patent No. 297,824, dated April 29, 1884.

Application filed September 28, 1883. (No model.)

*To all whom it may concern:*

Be it known that I, JACOB C. MCAFEE, a citizen of the United States, residing at Dallas, in the county of Marshall and State of West Virginia, have invented a new and useful Improvement in Nut-Locks; and I do hereby declare that the following is a full, clear, and exact description of the same, reference being had to the accompanying drawings, forming part of this specification, in which—

Figure 1:
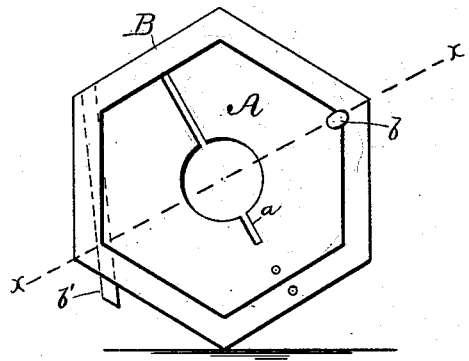
Figure 2:
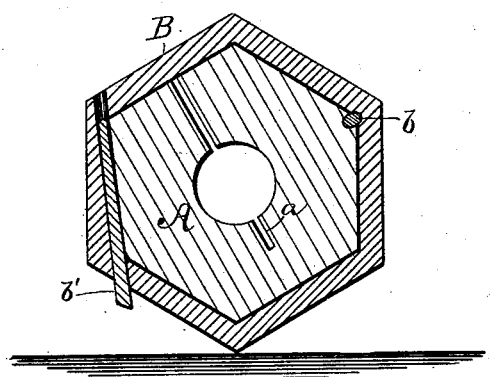
Figure 3:
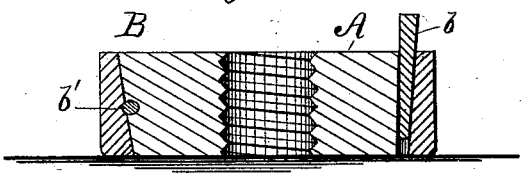

Figure 1 is a front view of the improved nut-lock. Fig. 2 is a section through the plane of the nut or at right angles to the bolt, and Fig. 3 is a section through the line $x\ x$ of Fig. 1.

My invention relates to nut-locks or devices for holding a nut upon a threaded bolt and preventing it from turning off from jar or vibratory action.

The invention consists of a split nut, in combination with an inclosing-band, and a key or wedge to be inserted between the band and the nut, to force the two sections of the nut to closer embrace upon the threaded bolt, so as to hold thereto firmly, as will be fully described hereinafter.

In the drawings, A represents the nut proper, which may be square, hexagonal, or other desired shape in outline, and which is slotted from its exterior to or past the bolt-hole, or which, instead of being simply slotted, may be cut entirely in two parts. I prefer, however, to slot the nut a little past the bolt-hole, as shown at $a$.

B is the inclosing-band, which is made of a shape to correspond to the outline of the nut. In the outer edge of the nut or the inner edge of the band, or in both, there is formed a key-seat, into which is driven a key. This key may be disposed parallel to the bolt, as shown at $b$, or it may be at right angles to the bolt, as shown at $b'$, in which latter case the ring must be drilled in the plane of the nut tangentially to the outer surface of the latter. When this nut is screwed upon the bolt, the band B is slipped laterally over the nut, so as to embrace it. The key is then driven in its seat, and its wedging action serves to force the two sections of the nut together to reduce the size of the bolt-hole, and thus lock the nut by tightly clamping it upon the bolt. To remove the nut a cold-chisel is inserted behind the nut, and between it and the washer, and is tapped with a few slight blows, when the band or ring comes off, and the nut may be unscrewed. To facilitate this loosening of the band or ring, its edge next to the washer is slightly beveled to admit the edge of the cold-chisel. When the key $b'$ is used, both the nut and band may be flared or tapered, as shown in Fig. 3, in such a way that the band will be tightened as it closes up against any bearing-surface. This also prevents the ring from shifting in any direction.

Advantages: First, it can be so tightly locked on the bolt that no jarring will loosen it; second, it can be readily unlocked or loosened, and so overcome the immovable setting by rust or otherwise, that is so common and troublesome; third, it may be clamped or stopped at any point on the bolt with varying degrees of tightness and without any injury to the bolt; fourth, it insures the full engagement of threads without the usual precision in tapping or threading the nut; fifth, nuts that are bursted and hitherto useless are as useful as any, with this improvement; sixth, it is free from cumbersome features—such as spurs, long wedges, &c.—but occupies no more room than ordinary nuts.

Having thus described my invention, what I claim as new is—

1. The combination of a split nut, an inclosing-band, and a key arranged between the band and the nut, to press the sections of the nut to closer contact with the bolt, substantially as shown and described.

2. The combination of the split nut and inclosing-band, having their adjacent faces made tapering, and the key $b'$, arranged at the joint of the nut and band, and disposed in the plane of the nut, as and for the purpose described.

Dallas, West Virginia, September 21, 1883.

JACOB C. McAFEE.

Witnesses:
GEO. D. TAYLOR,
DAVID DILLE.